United States Patent [19]

Sawada et al.

[11] Patent Number: 5,207,944

[45] Date of Patent: May 4, 1993

[54] LIQUID CRYSTAL COMPOSITION AND LIQUID CRYSTAL DISPLAY ELEMENT

[75] Inventors: Shinichi Sawada; Akiko Fukuda, both of Ichihara, Japan

[73] Assignee: Chisso Corporation, Tokyo, Japan

[21] Appl. No.: 919,373

[22] Filed: Jul. 29, 1992

Related U.S. Application Data

[63] Continuation of Ser. No. 774,652, Oct. 15, 1991, abandoned, which is a continuation of Ser. No. 507,577, Apr. 11, 1990, abandoned.

[30] Foreign Application Priority Data

Apr. 17, 1989 [JP] Japan .................................. 1-97228
Dec. 11, 1989 [JP] Japan .................................. 1-321218

[51] Int. Cl.$^5$ .................. C09K 19/52; C09K 19/34; G02F 1/13
[52] U.S. Cl. .................. 252/299.01; 252/299.61; 252/299.66; 359/103
[58] Field of Search ........... 252/299.01, 299.6, 299.61, 252/299.62, 299.63, 299.64, 299.65, 299.66; 359/103, 104

[56] References Cited

U.S. PATENT DOCUMENTS

| | | | |
|---|---|---|---|
| 4,130,502 | 12/1978 | Eidenschink et al. | 252/299.63 |
| 4,154,697 | 5/1979 | Eidenschink et al. | 252/299.63 |
| 4,261,651 | 4/1981 | Gray et al. | 350/350 R |
| 4,405,488 | 9/1983 | Sugimori et al. | 252/299.63 |
| 4,439,340 | 3/1984 | Kojima et al. | 252/299.63 |
| 4,670,182 | 6/1987 | Fujita et al. | 252/299.61 |
| 4,778,620 | 10/1988 | Goto et al. | 252/299.63 |
| 4,816,180 | 3/1989 | Goto et al. | 252/299.63 |
| 4,897,216 | 1/1990 | Reiffenrath et al. | 252/299.63 |

FOREIGN PATENT DOCUMENTS

| | | |
|---|---|---|
| 3835804 | 4/1990 | Fed. Rep. of Germany . |
| 8802130 | 3/1988 | World Int. Prop. O. . |
| 8903867 | 5/1989 | World Int. Prop. O. . |

OTHER PUBLICATIONS

Baur, "Optical Characteristics of Liquid Crystal Displays"; The Physics and Chemistry of Liquid Crystal Devices; Sprokel, Plenum Press, N.Y. pp. 61–78 (1980).
Waters et al., "Design of Highly Multiplexed Liquid Crystal Die Displays", Mol Cryst. Liq. Cryst., 123, pp. 303–319 (1985).
Scheffer et al., Appl. Phys. Lett, 45 (10, pp. 1020–1023 (Nov. 15, 1984).
Kaneko, "Liquid Crystal TV Displays: Principles and Applications of Liquid Crystal Displays", pp. 15 to 32, KTK Schientific Publishers, Tokyo, D. Reidel Publishing Company (1987).
Leenhouts et al. "Electro-Optics of Supertwist Displays; Dependence on Liquid Crystal Material Parameters", Japan Display '86, pp. 388–391.
Akatsuka et al., "Electro-optical Properties of Supertwisted Neumatic Display Obtained by Rubbing Technique", Japan Display '86, pp. 400 to 403.

Primary Examiner—Robert L. Stoll
Assistant Examiner—Shean C. Wu
Attorney, Agent, or Firm—Leydig, Voit & Mayer

[57] ABSTRACT

A nematic liquid crystal composition is provided having not only a high clearing point and a low viscosity and capable of exhibiting a desired Δn value, but also having an improved steepness in the voltage-transmittance characteristic in the SBE mode display. A liquid crystal display element is also provided. The composition is obtained by mixing a first component comprising a compound of the following formula (I) with a second component comprising a compound of the following formula (II), or by additionally mixing the first and second components with a third component comprising a group of compounds of the following formulas (III) and (IV), or further additionally mixing the first, second and third components with a fourth component comprising a compound of the following formula (V):

(Abstract continued on next page.)

-continued
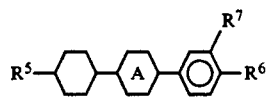 (III)
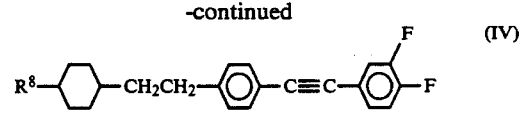 (IV)
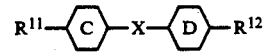 (V)
16 Claims, 1 Drawing Sheet

LIQUID CRYSTAL COMPOSITION AND LIQUID CRYSTAL DISPLAY ELEMENT

This application is a continuation of application Ser. No. 07/774,652, filed Oct. 15, 1991, now abandoned, which is a continuation of application Ser. No. 07/507,577, filed Apr. 11, 1990, now abandoned.

BACKGROUND OF THE INVENTION

1. Field of the Invention

This invention relates to a liquid crystal composition for liquid crystal displays. More particularly it relates to a liquid crystal composition used for high multiplex display devices making use of supertwisted birefringence effect mode.

2. Description of the Related Art

With recent rapid development of information devices, particularly growth of portable terminal devices, display devices of small size, thin shape and low power consumption, having a display capacity and a display quality matching those of conventional CRT have been required. In response to the above-mentioned needs for small size, thin shape and lower power consumption, liquid crystal devices capable of multiplex drive by means of TN type liquid crystal cells having a twist angle of 90°, have so far been used in the form of display terminals up to about 1/100 duty for watches, electronic calculators, etc. However, an increase of the duty number to more than the above has been regarded as difficult in principle, since it reduces the display quality.

Whereas, there has been known a supertwisted birefringence effect mode making use of the birefringence effect of liquid crystal cells, having set the twist angle to 180°–270°, at which the bistability in the electrooptical characteristic of chiral nematic liquid crystals occurs to the utmost. This mode is a supertwisted birefringence effect mode using an organic aligned membrane, and hereinafter abbreviated to SBE mode, including modes called STN mode and HBE mode. According to this SBE mode, the same drive method as in the matrix display of conventional TN mode of 90° twist, that is, the matrix display driven according to the first scan-addressing mode replying to the effective value of impressed voltage is possible, and also a considerably better contrast and a broader viewing angle than those in the case of TN display of 90° twist can be afforded (T. J. Scheffer, J. Nehring; Appl. Phys. Letter, 45, 1021 (1984)).

With reference to liquid crystal materials, in order to make the voltage-transmittance characteristic curve steep in the case of conventional 90° twist TN mode, it is necessary to make the elastic constant ratio $K_{33}/K_{11}$ of liquid crystal materials as low as possible. This is evident for example from the report of G. Baur {The Physics and Chemistry of Liquid Crystal Devices (edited by G. J. Sprokel), pp 61–78 (1980)}. However, in order to make the voltage-transmittance characteristic curve steep in the case of a SBE mode, it is necessary to make the ratio $K_{33}/K_{11}$ as large as possible, contrary to the case of 90° twist TN mode. Further, it is preferred that the ratio $K_{33}/K_{22}$ also be larger. This is evident e.g. from the report of C. M. Waters (Design of Highly Multiplexed Liquid Crystal Dye Displays, Mol. Cryst. Liq. Cryst., 1985, vol. 123, pp 303–319). Here, $K_{11}$, $K_{22}$ and $K_{33}$ represent a splay elastic constant, a twisted one and a bent one, respectively, in the continiuum theory (F. Frank: Dix. Faraday Soc., 25, p 19 (1956)).

Namely, as described above, the physical property value for making the voltage-transmittance characteristic curve steep, i.e. the elastic constant ratio $K_{33}/K_{11}$ in the case of a 90° twist TN mode is quite contrary to that in the case of SBE mode. Thus, it can be seen that liquid crystal compositions used so far in the 90° twist TN mode are unsuitable for making the voltage-transmittance characteristic curve steep in the SBE mode.

The main object of the present invention is to provide a liquid crystal composition suitable for liquid crystal display elements of SBE mode for making the voltage-transmittance characteristic curve steep, taking into account the above-mentioned theoretical background and the practical needs for a liquid crystal display element.

Characteristics required for liquid crystal compositions used for display elements of the SBE mode are as follows:

(1) steep voltage-transmittance characteristic curve;
(2) high nematic-isotropic liquid phase transition point;
(3) capability of exhibiting a suitable optical anisotropy value (hereinafter abbreviated to $\Delta n$) in accordance with the cell thickness (hereinafter abbreviated to d);
(4) low viscosity (hereinafter abbreviated to $\eta$); etc.

The characteristic (1) is indispensable for enhancing the display contrast of liquid crystal display elements of SBE mode.

The characteristic (2) is necessary for inhibiting the display from coloring occurrence due to the temperature-dependency of $\Delta n$ in the SBE mode, and a clearing point (hereinafter abbreviated to NI point) is desired to be as high as possible. The $\Delta n$ value generally exhibits a curve slowly declining from the lower temperature side toward the higher temperature side, but it begins to rapidly lower in the vicinity of the clearing point, and the display color changes when the light path length of birefringence ($\Delta n \cdot d$) changes notably. Further, when it reaches the NI point, $\Delta n = 0$, that is, an isotropic liquid is formed lose which lacks the function necessary for liquid crystal display elements. A practical NI point for display elements is preferred to be 80° C. or higher.

The characteristic (3) is important for enhancing the degree of freedom of the cell thickness of liquid crystal display elements. The SBE mode uses as its display an interference color due to the birefringence effect based upon the light path length ($\Delta n \cdot d = $ constant) of birefringence, differently from the TN mode. Thus, it is preferred to be able to take various $\Delta n$ values corresponding to an optional d.

The characteristic (4) is particularly advantageous for reducing the response time in liquid crystal cells of the SBE mode. It is known that as to the response time in the TN mode, the rise time and decay time are both proportional to $\eta \cdot d^2$. This relationship is also applicable to the SBE mode.

SUMMARY OF THE INVENTION

An object of the present invention is to provide a nematic liquid crystal composition not only having a high clearing point and a low viscosity and capable of taking a desired $\Delta n$ value, but also having an improved steepness in the voltage-transmittance characteristic curve in the SBE mode display.

Another object of the present invention is to provide a liquid crystal display element having a steepness in the voltage-transmittance curve and a good contrast in the SBE mode.

The present inventors have made extensive research for solving the above-mentioned problems, and as a result have found that a liquid crystal composition obtained by mixing a first component comprising a compound expressed by the formula (I) mentioned later with a second component comprising a compound expressed by the formula (II) mentioned later, or additionally mixing the first and second components with a third component comprising a group of compounds expressed by the formulas (III) and (IV) mentioned later, or further additionally mixing the first, second and third components with a fourth component comprising a compound expressed by the formula (V) mentioned later can improve the above-mentioned characteristics to a large extent, and thus achieve the present invention.

Namely, the liquid crystal composition in the first aspect of the present invention comprises as indispensable components, a first component comprising at least one compound expressed by the formula

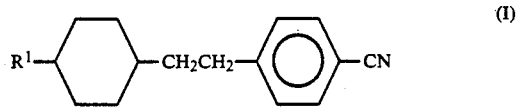
(I)

wherein $R^1$ represents an alkyl group of 1 to 10 carbon atoms, and a second component comprising at least one member of compounds expressed by the formula

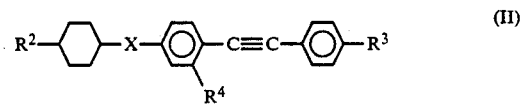
(II)

wherein $R^2$ represents an alkyl group of 1 to 10 carbon atoms, $R^3$ represents an alkyl group or an alkoxy group each of 1 to 10 carbon atoms, $R^4$ represents H or F and X represents a single bond or —CH$_2$CH$_2$—.

The blending proportion of the first component is preferably 20 to 70% by weight and that of the second component is preferably 20 to 50% by weight.

Further, the liquid crystal composition in the second aspect of the present invention comprises as indispensable components, besides the first and second components, a third component comprising at least one member selected from the group consisting of compounds expressed by the formula

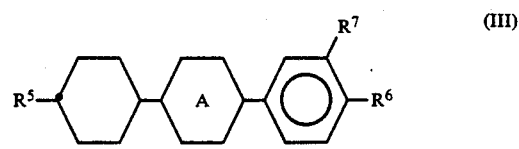
(III)

wherein $R^5$ represents an alkyl group of 1 to 10 carbon atoms, $R^6$ represents F or CN group, $R^7$ represents H or F

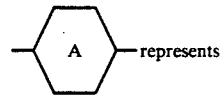 represents

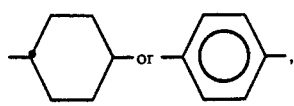

and compounds expressed by the formula

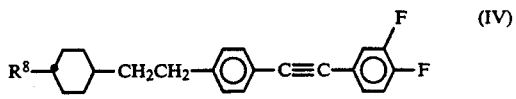
(IV)

wherein $R^8$ represents an alkyl group of 1 to 10 carbon atoms.

The blending proportions of the first component, the second component and the third component are preferably 10 to 60% by weight, 10 to 40% by weight and 10 to 40% by weight, respectively. The compounds of the formula (III) are particularly preferred to be compounds expressed by the formula

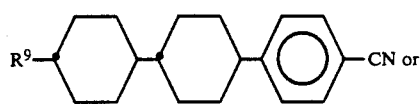

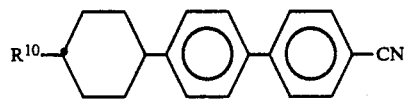

wherein $R^9$ and $R^{10}$ each independently represent an alkyl group of 1 to 10 carbon atoms.

Further, the liquid crystal composition in the third aspect of the present invention comprises as indispensable components, besides the first, second and third components, a fourth component comprising at least one member of compounds expressed by the formula

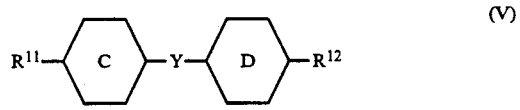
(V)

wherein $R^{11}$ and $R^{12}$ each independently represent an alkyl group, an alkoxy group each of 1 to 10 carbon atoms, or an alkoxymethyl group of 1 to 10 carbon atoms, of 2 to 10 carbon atoms,

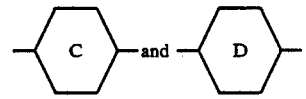

each independently represent

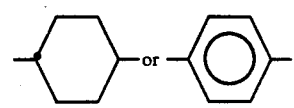

and Y represents a single bond, —COO—, —C≡C— or —CH$_2$CH$_2$—.

The blending proportions of the first, second, third and fourth components are preferably 10 to 60% by weight, 10 to 40% by weight, 10 to 40% by weight and 10 to 40% by weight, respectively. The compounds of the formula (V) are particularly preferred to be compounds expressed by the formula

wherein $R^{13}$ represents an alkyl group of 1 to 10 carbon atoms and $R^{14}$ represents an alkoxy group of 1 to 10 carbon atoms.

The liquid crystal display element in the present invention is characterized by a liquid crystal composition comprising the above-mentioned first and second components. Embodiments of the above liquid crystal display element include a liquid crystal composition comprising the above first, second and third components or a liquid crystal composition comprising the above first, second, third and fourth components. The respective blending proportions of the components of these liquid crystal compositions are preferred to be the above blending proportions of the liquid crystal compositions of the present invention.

DETAILED DESCRIPTION OF PREFERRED EMBODIMENTS

Figure 1:
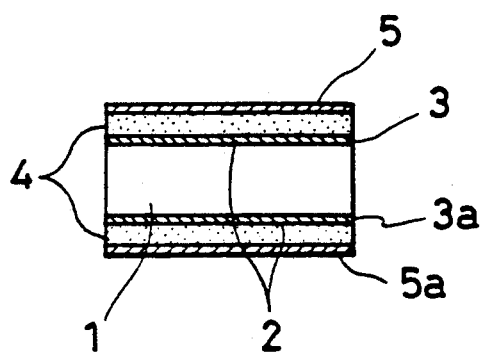
FIG. 1 shows a crosssectional view illustrating the structure of a liquid crystal cell used for measuring the voltage-transmittance characteristics of liquid crystals in the examples and comparative example.

The liquid crystal composition of the present invention may also contain besides the compounds expressed by the above formulas (I) to (V), other nematic liquid crystals or liquid crystalline compounds in a suitable quantity within a range wherein the object of the present invention is attainable, in order to adjust the threshold voltage, mesomorphic range, viscosity, etc. of the composition.

Preferable, representative examples of such other compounds are as follows:

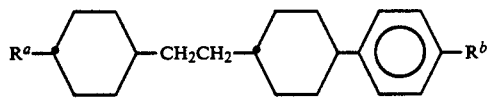

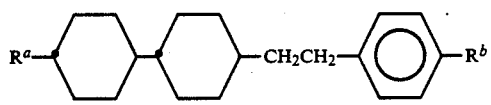

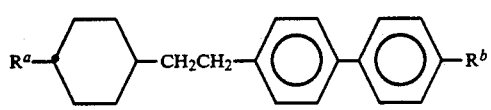

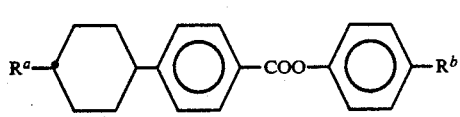

-continued

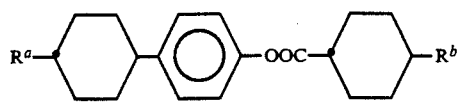

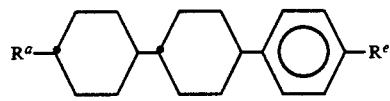

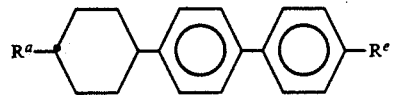

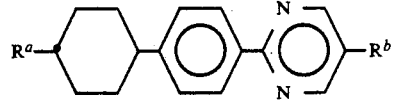

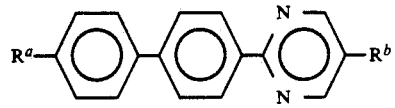

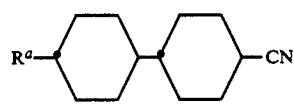

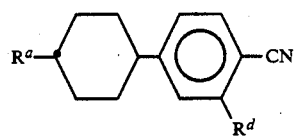

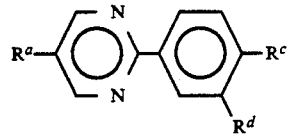

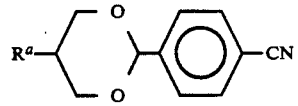

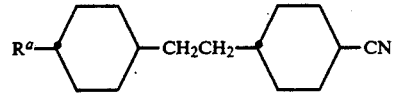

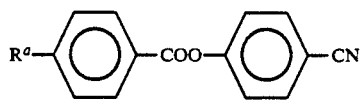

In the above formulas, $R^a$ represents an alkyl group, an alkoxymethyl group or F, $R^b$ represents an alkyl group, an alkoxy group or F, $R^c$ represents an alkyl group, an alkoxy group, F or CN group, $R^d$ represents H or F, and $R^e$ represents an alkyl group or an alkoxy group.

Among compounds expressed by the formula (I), which are disclosed in Japanese patent publication No. Sho 58-27785/1983, those having alkyl chain lengths of 2, 3 and were blended in a ratio of 17:40:43 to obtain a resulting mixture, the physical properties of which are shown in Table 1.

Mp (° C.) represents a melting point, NI (° C.) represents a nematic-isotropic point, i.e. a clearing point, $\Delta n$ and $\Delta \epsilon$ represent an optical anisotropy value at 25° C. and a dielectric anisotropy value at 25° C., respectively, $K_{33}/K_{11}$ and $K_{33}/K_{22}$ represent elastic constant ratios, respectively, and $\eta$ represents a viscosity at 20° C. The above definitions are also applied in Tables 2-4.

TABLE 1

| | |
|---|---|
| Mp (°C.) | −1.0 |
| NI (°C.) | 40.8 |
| η (cp) | 23.5 |
| Δn | 0.113 |
| Δε | 9.79 |
| k₃₃/k₁₁ | 2.22 |
| k₃₃/k₂₂ | 2.74 |

As shown in Table 1, the compounds expressed by the formula (I) have a high dielectric anisotropy, but nevertheless have a low viscosity and a low optical anisotropy and also exhibit a broad mesomorphic range with only three components. What is further characteristic is that the elastic constant ratios $K_{33}/K_{11}$ and $K_{33}/K_{22}$ are so large that the compounds can be said to be suitable for a SBE mode. In addition, a room temperature liquid crystal 4′-pentyl-4-cyanobiphenyl generally used for a TN mode exhibited a $K_{33}/K_{11}$ value of 1.30 and a $K_{33}/K_{22}$ value of 2.39. Further, these values are obtained by approximating the theoretical curve obtained from the continiuum theory to the capacity-voltage curve obtained in the case where an electric field is impressed perpendicularly to the homogeneous or 90° twist-aligned liquid crystal molecular axis.

The content of the compounds expressed by the formula (I) as the first component is suitable to be 20 to 70% by weight in the composition which lacks the above third component, and 10 to 60% by weight in the composition containing the same. When the content exceeds 70% by weight or 60% by weight, since the NI point of these compounds is so low that the N-I point of the resulting composition decreases a change in the color of the above-mentioned cell is liable to occur. On the other hand, if the content is lower than 20% by weight or 10% by weight, the above-mentioned effectiveness may be absent.

Examples of the compounds expressed by the formula (II) as the second component of the present invention are as follows:

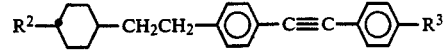

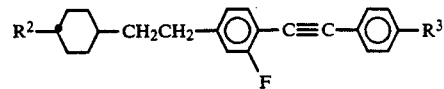

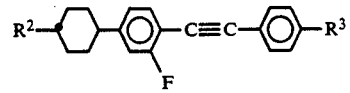

A mixture obtained by dissolving

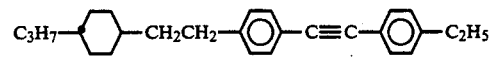

in 15% by weight in commercially available liquid crystals Zli-1083 (trademark of cyclohexanebenzonitrile compounds made by Merck Co., Ltd.) is named B1, and mixtures obtained by dissolving

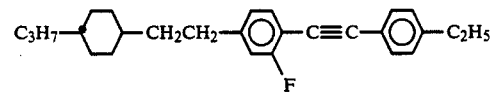

and

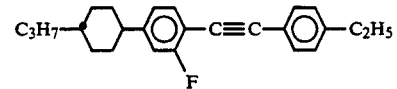

in the same manner as the above are named B2 and B3, respectively. The values of physical properties of these mixtures are shown in Table 2 together with those of Zli-1083.

TABLE 2

| | B1 | B2 | B3 | Zl i-1083 |
|---|---|---|---|---|
| NI (°C.) | 68 | 65.1 | 66.9 | 52.3 |
| η (cp) | 21.1 | 21.2 | 22.2 | 21.7 |
| Δn | 0.141 | 0.136 | 0.139 | 0.119 |
| Δε | 9.8 | 9.9 | 10.1 | 10.7 |

As partly evident from Table 2, compounds expressed by the formula (II) exhibit physical property values common thereto in that they have a negative dielectric anisotropy value, a large optical anisotropy value, a low viscosity for compounds having three rings and a high clearing point distributed over about 150° C. to 190° C. The content of these compounds in the present invention is 20 to 50% by weight in the composition not containing the above third component, and 10 to 40% by weight in the composition containing the same. As described above, since they have a high clearing point, if it exceeds 50% by weight or 40% by weight, in the above compositions, there is a fear that the lower limit temperature of the nematic phase rises to narrow the range of the operating temperature, while if it is less than 20% by weight or 10% by weight, the clearing point of the resulting composition is insufficient, so the above-mentioned color of the cell often changes.

Examples of the compounds expressed by the formula (III) or (IV) as the third component are as follows:

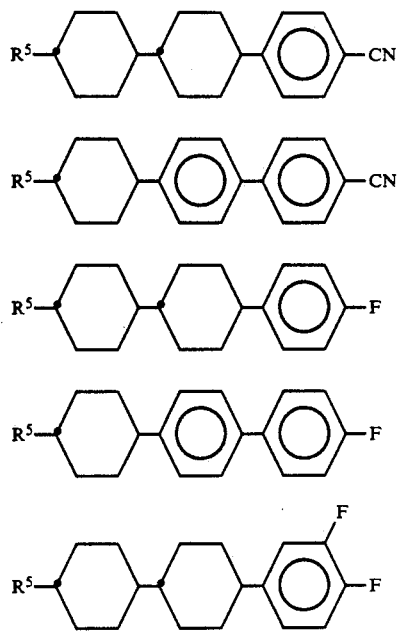

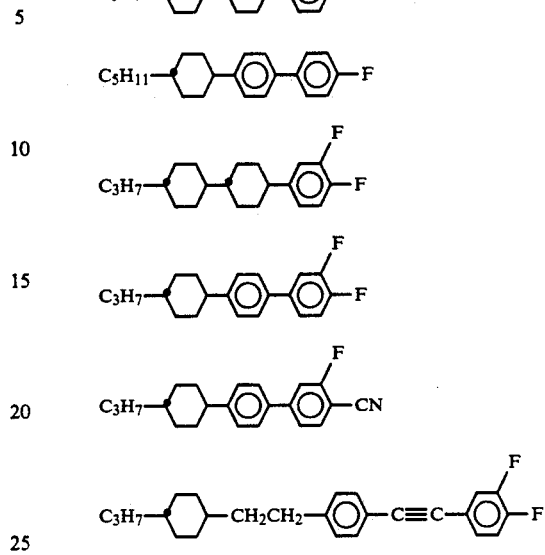

Mixtures obtained by dissolving each of the following compounds in 15% by weight in Zli-1083 (trademark) were named C1, C2, C3, C4, C5, C6, C7 and C8:

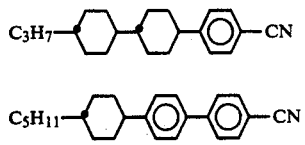

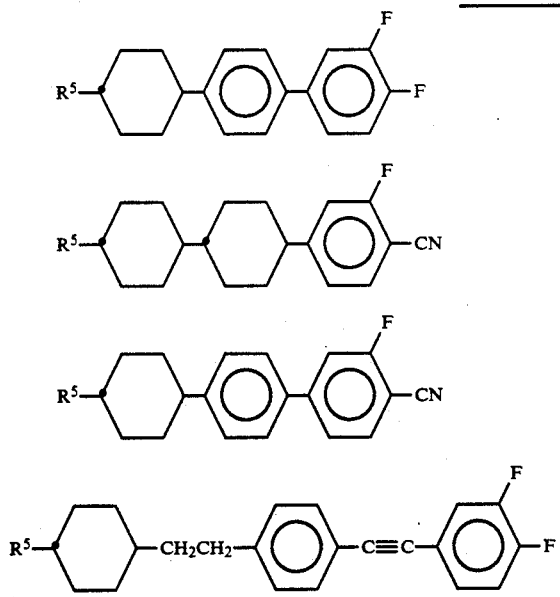

The values of physical properties of these mixtures are shown in Table 3.

TABLE 3

|  | C1 | C2 | C3 | C4 | C5 | C6 | C7 | C8 |
|---|---|---|---|---|---|---|---|---|
| NI (°C.) | 75.6 | 72.2 | 63.1 | 61.0 | 59.0 | 53.3 | 69.3 | 61.1 |
| η (cp) | 26.6 | 25.4 | 20.3 | 23.9 | 21.2 | 24.4 | 26.7 | 24.1 |
| Δn | 0.132 | 0.139 | 0.115 | 0.122 | 0.118 | 0.120 | 0.126 | 0.132 |
| Δε | 10.9 | 11.0 | 10.0 | 11.0 | 10.4 | 10.4 | 13.0 | 10.4 |

As partly evident from Table 3, the compounds expressed by the formula (III) or (IV) exhibit physical property values common thereto in that they have a positive dielectric anisotropy, a relatively low viscosity for compounds having three rings, a high clearing point, etc.

The content of these compounds in the present invention is preferable to be 10 to 40% by weight. Most of these compounds exhibit a clearing point distributed over about 100° C. to 250° C. If the content exceeds 40% by weight, depending on the combination of the compounds of the formula (I) with those of the formula (II), there is a fear that the lower limit temperature of the nematic phase of the resulting composition rises, to narrow the range of the operating temperature, while if it is less than 10% by weight, the clearing point of the resulting composition is insufficient, so the color of the cell often changes.

Examples of the compounds expressed by the formula (V) of the present invention are as follows

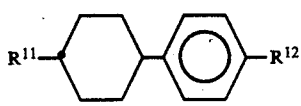

-continued

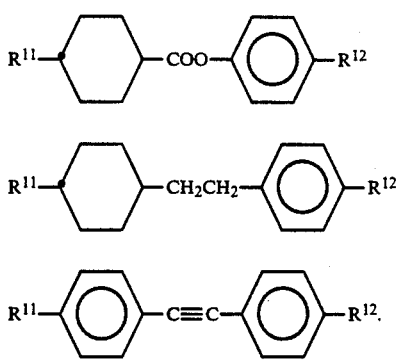

Mixtures obtained by dissolving each of the following compounds in 15% by weight of commercially available liquid crystals of cyclohexanebenzonitrile compounds Zli-1132 (trademark) made by Merck Co., Ltd. were named D1, D2, D3, D4 and D5, respectively:

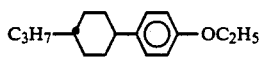

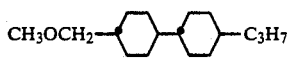

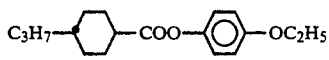

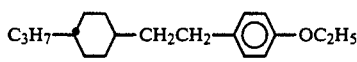

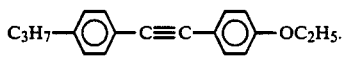

The values of physical properties of these mixtures are shown in Table 4 together with those of Zli-1132.

TABLE 4

|  | D1 | D2 | D3 | D4 | D5 | 1132 |
| --- | --- | --- | --- | --- | --- | --- |
| NI (°C.) | 64.1 | 67.3 | 70.2 | 65.1 | 70.8 | 72.4 |
| η (cp) | 21.7 | 20.6 | 26.6 | 22.1 | 22.8 | 27.0 |
| Δn | 0.124 | 0.115 | 0.125 | 0.124 | 0.157 | 0.137 |
| Δε | 10.0 | 9.7 | 9.4 | 9.7 | 9.9 | 11.0 |

As partly evident from Table 4, the compounds expressed by the formula (V) exhibit physical property values common thereto in that they have a negative dielectric anisotropy, a low viscosity and a relatively low clearing point.

The content of these compounds in the present invention is preferable to be 10 to 40% by weight. Most of these compounds exhibit a clearing point distributed over about 30° C. to 90° C., if the content exceeds 40% by weight, depending on the combination of compounds of the formulas (I), (II) and (III) or (IV), there is a fear that the clearing point of the resulting composition is reduced, so the above-mentioned color of the cell changes, while if it is less than 10% by weight, the viscosity of the resulting composition often rises to make the response time longer.

EXAMPLE

The present invention will be described in more detail by way of examples, but it should not be construed to be limited thereto. In addition, the steepness of the voltage-transmittance characteristic curve referred to herein is defined as follows:

When the voltages in the case where the light transmittances in the light axis direction perpendicular to the display plane are 10% and 80% are denoted by $V_{10}$ and $V_{80}$, respectively, then the resulting steepness is defined by the following equation:

$$\alpha = V_{80}/V_{10} \tag{1}$$

Herein, $V_{10}$ refers to a threshold voltage.

Thus, this means that the closer to 1 the parameter $\alpha$, the steeper the voltage-brightness characteristic. A parameter Nmax expressing the multiplex number is defined by the following equation using the above $\alpha$:

$$Nmax = \left(\frac{\alpha^2 + 1}{\alpha^2 - 1}\right)^2 \tag{2}$$

This indicates that the larger the Nmax, the higher the resulting multiplex. The proportions of the components in examples and comparative example mentioned below are all by percent by weight.

EXAMPLE 1

A liquid crystal composition consisting of the following three compounds as the first component was prepared:

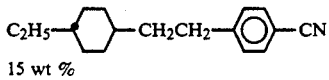

15 wt %

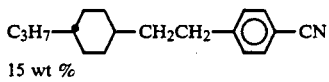

15 wt %

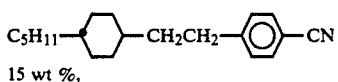

15 wt %, the following six compounds as the second component:

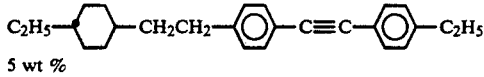

5 wt %

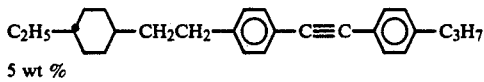

5 wt %

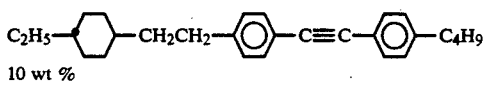

10 wt %

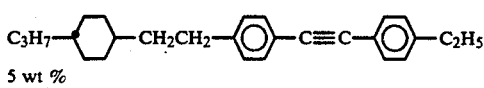

5 wt %

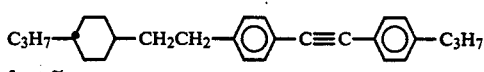

5 wt %

-continued

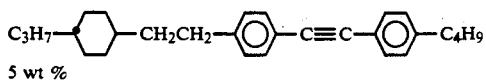
5 wt % and the following two compounds as the third component:

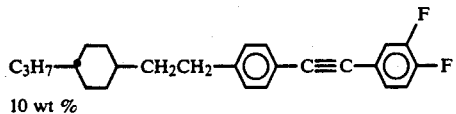
10 wt %

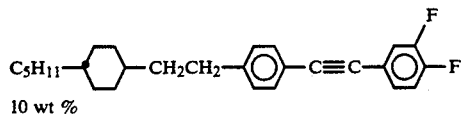
10 wt % and the characteristics of the liquid crystal composition were measured. The results are shown in Table 5.

Figure 2:
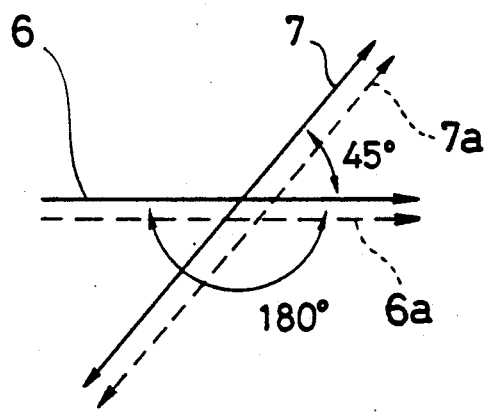
FIG. 2 shows a view illustrating the relationship between the rubbing direction of the cell and the absorption axis of the polarizing plate thereof.

A liquid crystal 1 obtained by adding a chiral substance (S-811 made by Merck Co., Ltd.) to the above liquid crystal composition was sealed in a cell having a twist angle of 180° provided with plane transparent electrodes 2 having rubbed upper side and lower side aligned membranes (PSI-871-PPP, trademark, made by Chisso Corporation) of a polyimide compound, 3 and 3a, respectively, under conditions of a Δn·d of 800 nm and a d/P of 0.42 without any occurrence of stripe domain and a low order twist, followed by applying thereon upper side and lower side polarization plates 5 and 5a to measure the voltage-transmittance characteristic. FIG. 2 shows the relationship between the rubbing direction of the above cell and the absorption axis of the polarization plates thereof. In this figure, 6 and 6a show the rubbing direction of the upper side aligned membrane and that of the lower side aligned membrane, respectively, while 7 and 7a show the absorption axis of the upper side polarization and that of the lower side polarization plate, respectively. In addition, the above-mentioned aligned membranes have a pretilt angle of 3.5° in the above-mentioned Zli-1132 (trademark). The pretilt angle was measured according to the crystal rotation system (T. J. Scheffer and J. Nehring; J. of Applied Physics, Vol. 48, No. 5, May, 1977).

The above-mentioned P refers to the helical pitch intrinsic of chiral nematic liquid crystals, and d refers to the cell thickness i.e. the distance between two electrodes.

The threshold voltage at 25° C. was 1.860 V, the parameter α expressing the steepness was 1.099 and the parameter Nmax expressing the multiplex number was 113.

EXAMPLE 2

There was prepared a liquid crystal composition consisting of the following three compounds as the first component:

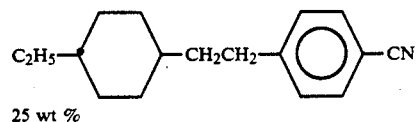
25 wt %

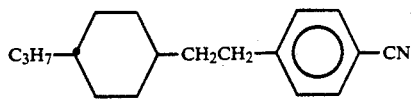
15 wt %

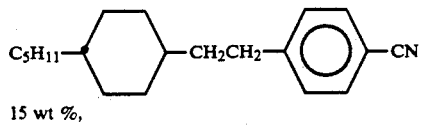
15 wt %, the following compound as the second component:

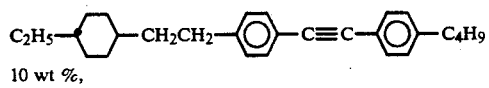
10 wt %, and the following four compounds as the third component:

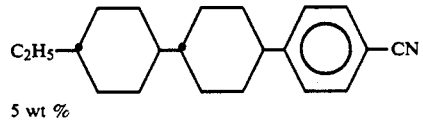
5 wt %

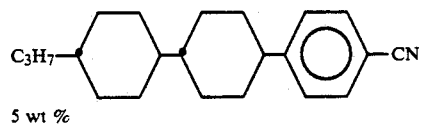
5 wt %

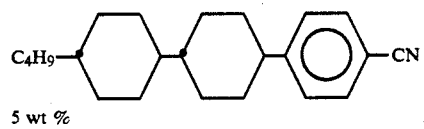
5 wt %

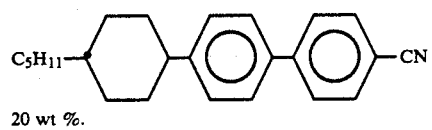
20 wt %.

Its characteristics were measured in the same manner as in Example 1. The results are shown in Table 5.

EXAMPLE 3

There was prepared a liquid crystal composition consisting of the following three compounds as the first component:

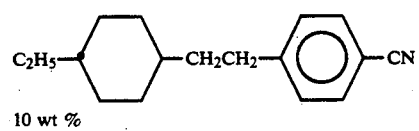
10 wt %

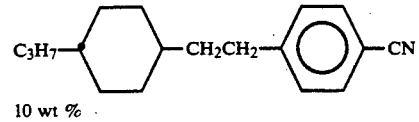
10 wt %

-continued

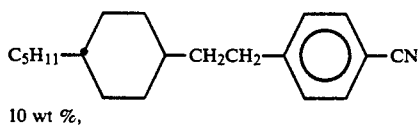
10 wt %, the following three compounds as the second component:

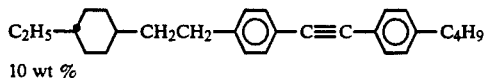
10 wt %

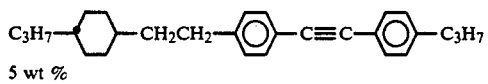
5 wt %

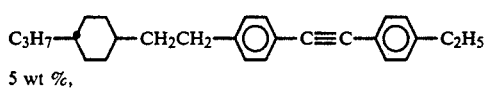
5 wt %, the following four compounds as the third component:

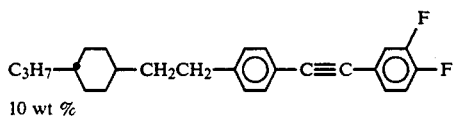
10 wt %

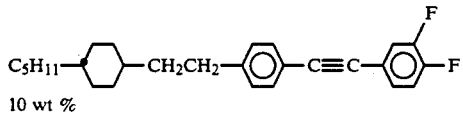
10 wt %

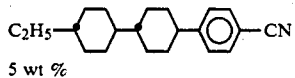
5 wt %

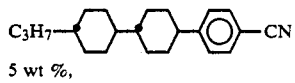
5 wt %, and the following two compounds as other compounds than those of the first to the fourth components:

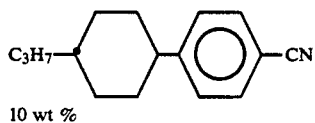
10 wt %

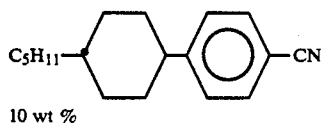
10 wt % and its characteristics were measured in the same manner as in Example 1. The results are shown in Table 5.

EXAMPLE 4

There was prepared a liquid crystal composition consisting of the following compound as the first component:

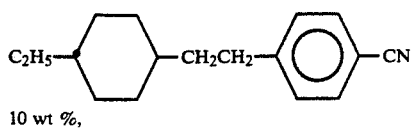
10 wt %, the following five compounds as the second component:

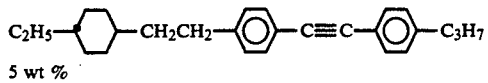
5 wt %

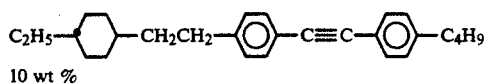
10 wt %

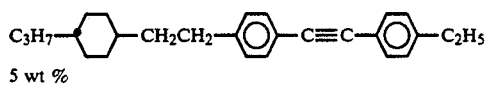
5 wt %

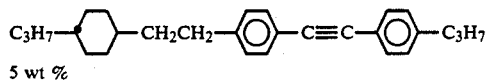
5 wt %

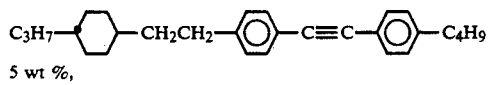
5 wt %, the following five compounds as the third component:

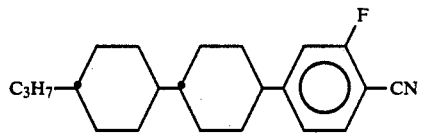
10 wt %

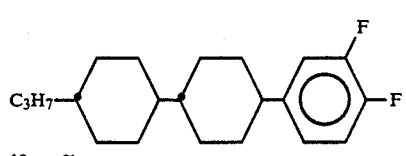
10 wt %

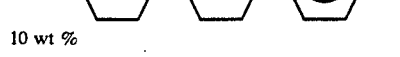
5 wt %

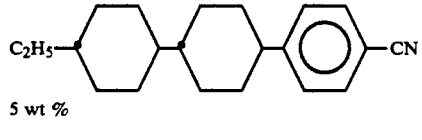
5 wt %

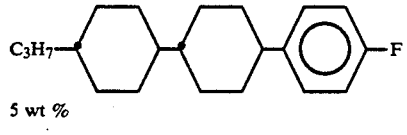
10 wt % and the following two compounds as the other compounds than those of the first to the fourth components:

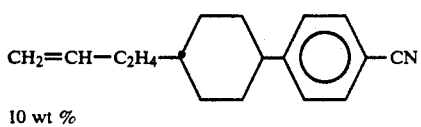

10 wt %

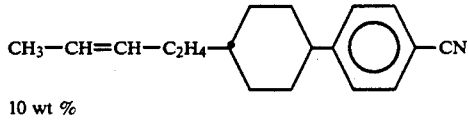

10 wt % and its characteristics were measured in the same manner as in Example 1. The results are shown in Table 5.

EXAMPLE 5

There was prepared a liquid crystal composition consisting of the following three compounds as the first component:

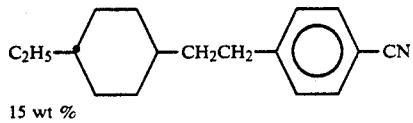

15 wt %

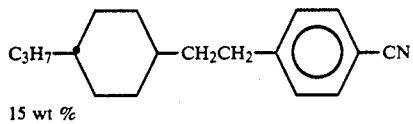

15 wt %

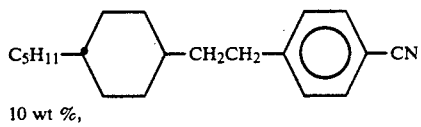

10 wt %, the following three compounds as the second component:

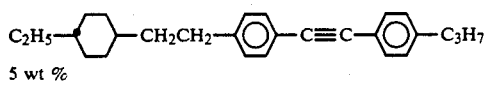

5 wt %

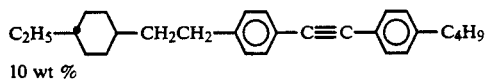

10 wt %

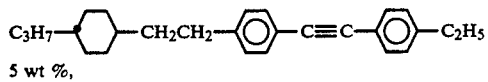

5 wt %, the following three compounds as the third component:

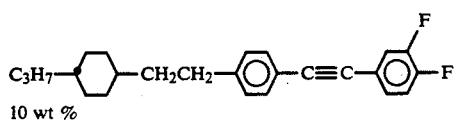

10 wt %

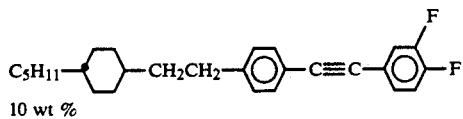

10 wt %

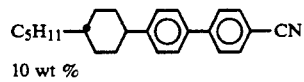

10 wt % and the following compound as the fourth component:

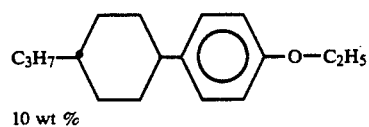

10 wt % and its characteristics were measured in the same manner as in Example 1. The results are shown in Table 5.

EXAMPLE 6

There was prepared a liquid crystal composition consisting of the following compound as the first component:

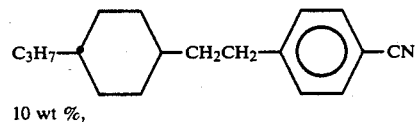

10 wt %, the following three compounds as the second component:

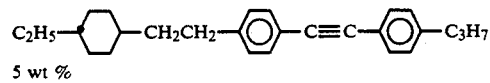

5 wt %

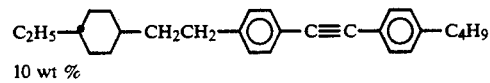

10 wt %

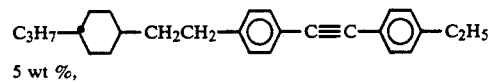

5 wt %, the following four compounds as the third component:

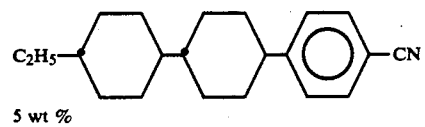

5 wt %

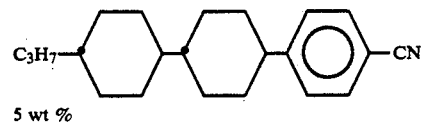

5 wt %

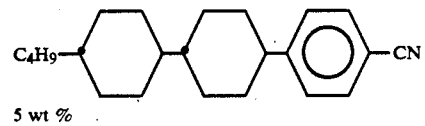

5 wt %

-continued

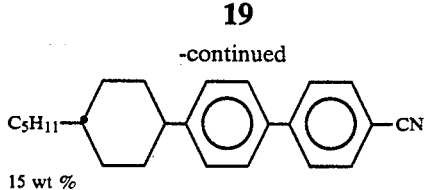
15 wt % and the following three compounds as the fourth component:

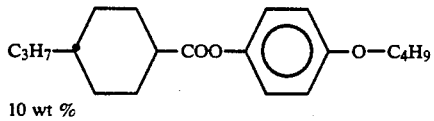
10 wt %

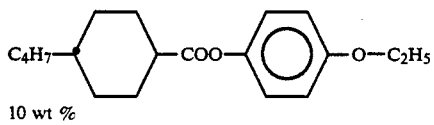
10 wt %

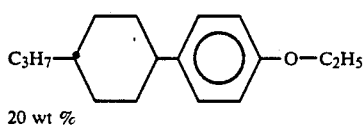
20 wt % and its characteristics were measured in the same manner as in Example 1. The results are shown in Table 5.

EXAMPLE 7

There was prepared a liquid crystal composition consisting of the following two compounds as the first component:

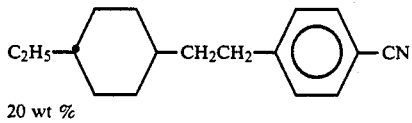
20 wt %

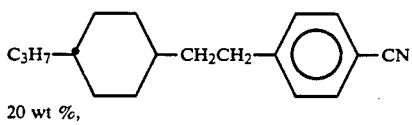
20 wt %, the following compound as the second component:

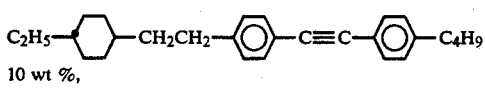
10 wt %, the following six compounds as the third component:

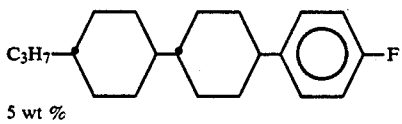
5 wt %

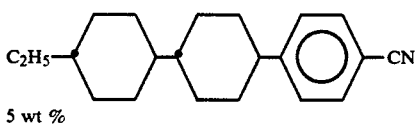
5 wt %

-continued

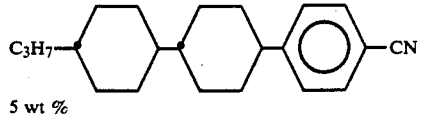
5 wt %

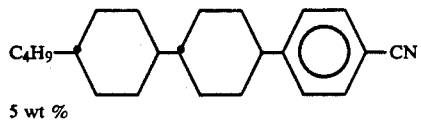
5 wt %

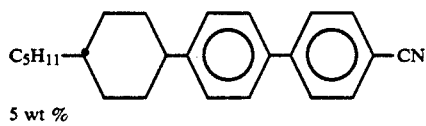
5 wt %

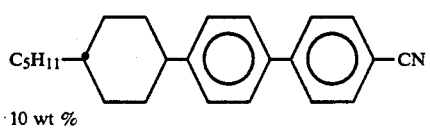
10 wt % ps and the following two compounds as the fourth component:

$CH_3-O-CH_2$— —$C_3H_7$ 10 wt %

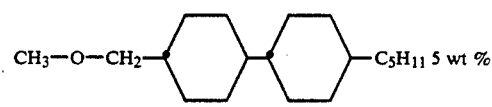
$CH_3-O-CH_2$— —$C_5H_{11}$ 5 wt % and its characteristics were measured in the same manner as in Example 1. The results are shown in Table 5.

EXAMPLE 8

There was prepared a liquid crystal composition consisting of the following compound as the first component:

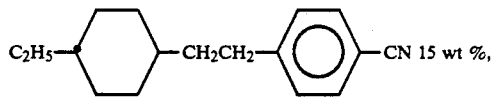
15 wt %, the following two compounds as the second component:

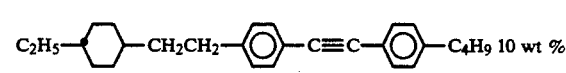
10 wt %

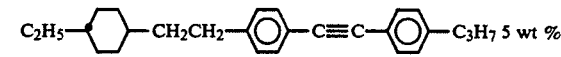
5 wt % the following six compounds as the third component:

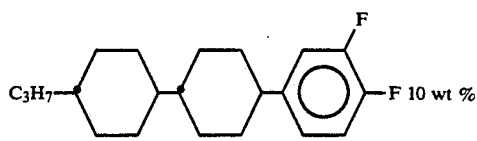
10 wt %

-continued

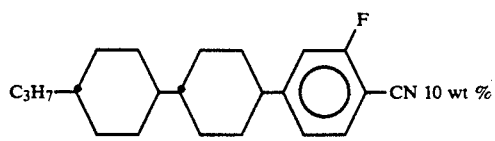 5

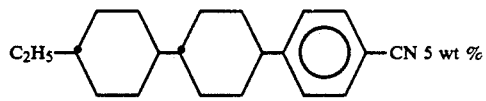 10

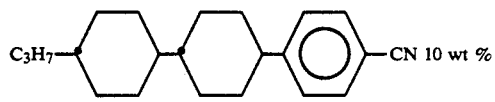 15

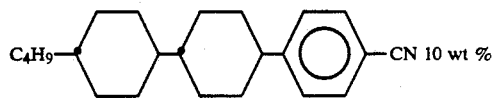 20

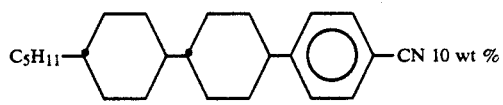 25 the following three compounds as the fourth component:

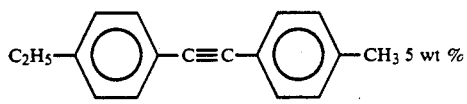

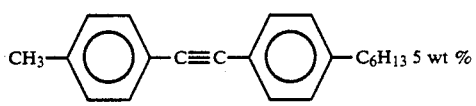

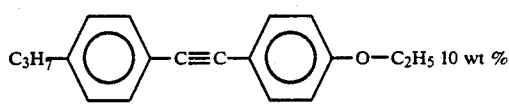

and the following compound as another compound than those of the first to fourth components:

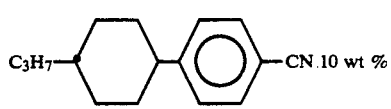

and its characteristics were measured in the same manner as in Example 1. The results are shown in Table 5.

COMPARATIVE EXAMPLE 1

For comparison, there was prepared a liquid crystal composition consisting of the following known eight compounds generally used:

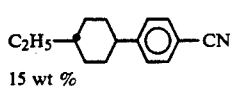

-continued

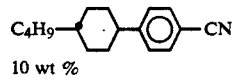
10 wt %

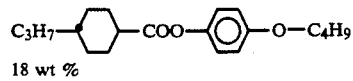
18 wt %

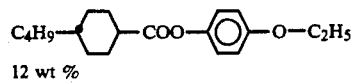
12 wt %

12 wt %

10 wt %

8 wt %

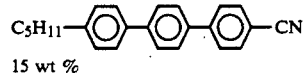
15 wt % and its characteristics were measured in the same manner as in Example 1. The results are shown in Table 5.

EXAMPLE 9

There was prepared a liquid crystal composition consisting of the following two compounds as the first component:

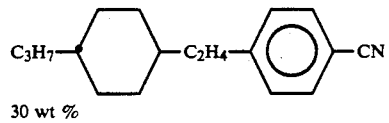
30 wt %

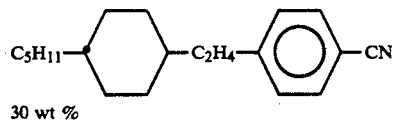
30 wt % and the following five compounds as the second component

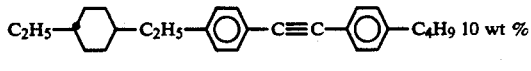

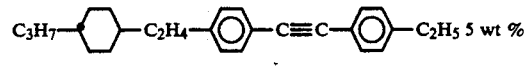

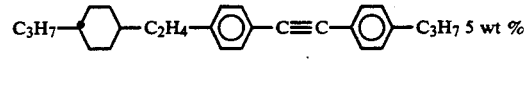

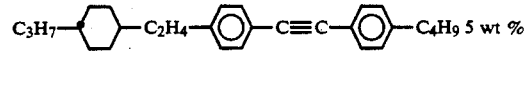

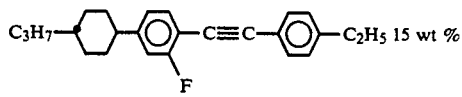

and its characteristics were measured in the same manner as in Example 1. The results are shown in Table 5.

EXAMPLE 10

There was prepared a liquid crystal composition consisting of the following two compounds as the first component:

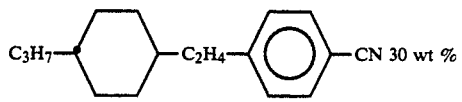

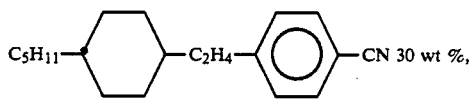

the following two compounds as the second component:

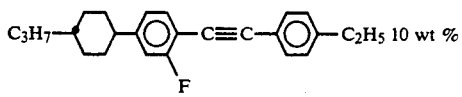

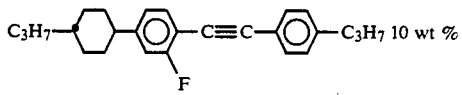

and the following two compounds as other compounds than those of the first to the fourth components:

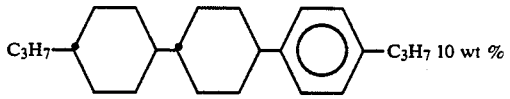

and its characteristics were measured in the same manner as in Example 1. The results are shown in Table 5.

EXAMPLE 11

There was prepared a liquid crystal composition consisting of the following two compounds as the first component:

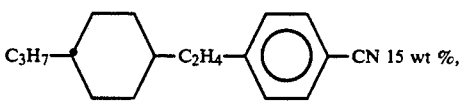

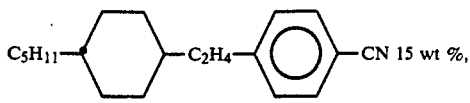

the following seven compounds as the second component:

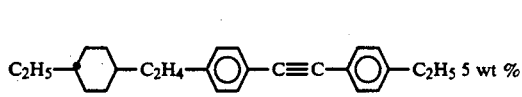

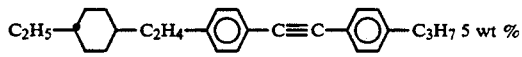

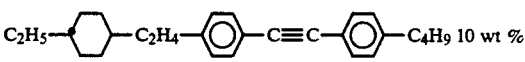

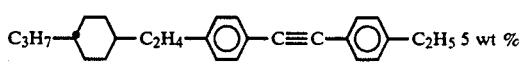

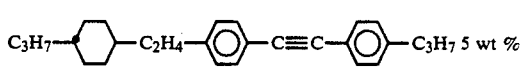

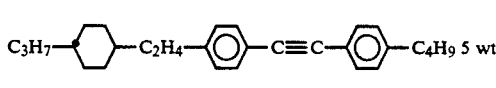

and the following two compounds as other compounds than those of the first to the fourth components:

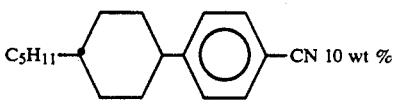

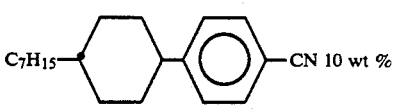

and its characteristics were measured in the same manner as in Example 1. The results are shown in Table 5.

EXAMPLE 12

There was prepared a liquid crystal composition consisting of the following two compounds as the second component:

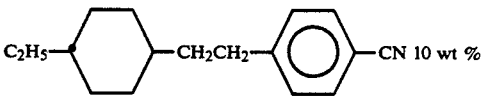

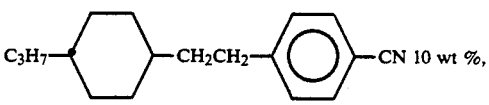

the following compound as the second component:

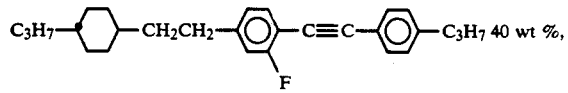 40 wt %, the following three compounds as the third component:

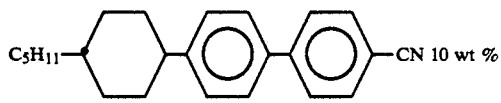 CN 10 wt %

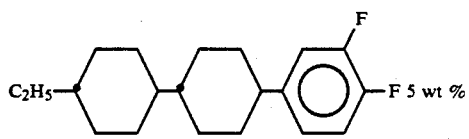 F 5 wt %

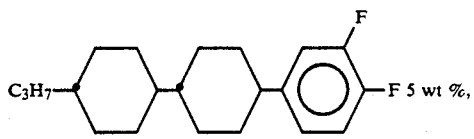 F 5 wt %, the following compound as the fourth component:

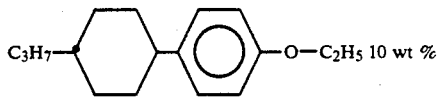 O—C$_2$H$_5$ 10 wt % and the following compound a compound other than those of the first to the fourth component:

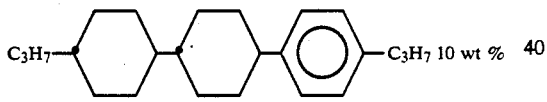 C$_3$H$_7$ 10 wt % and its characteristics were measured in the same manner as in Example 1. The results are shown in Table 5.

EXAMPLE 13

There was prepared a liquid crystal composition consisting of the following three compounds as the first component:

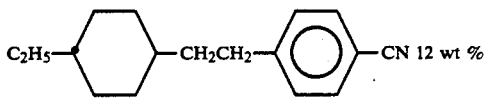 CN 12 wt %

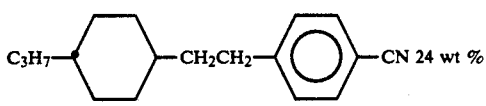 CN 24 wt %

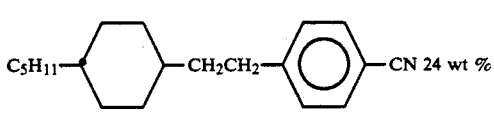 CN 24 wt % and the following three compounds as the second component:

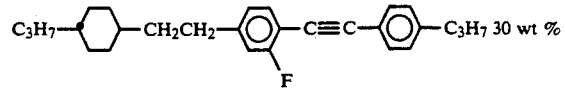 C$_3$H$_7$ 30 wt %

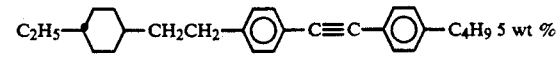 C$_4$H$_9$ 5 wt %

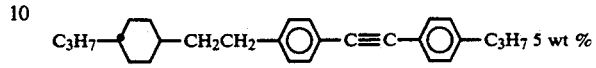 C$_3$H$_7$ 5 wt % and its characteristics were measured in the same manner as in Example 1. The results are shown in Table 5.

EXAMPLE 14

There was prepared a liquid crystal composition consisting of the following three compounds as the first component:

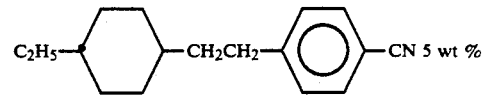 CN 5 wt %

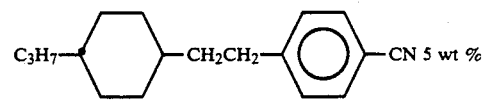 CN 5 wt %

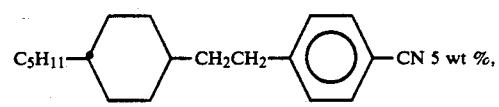 CN 5 wt %, and the following four compounds as the second component:

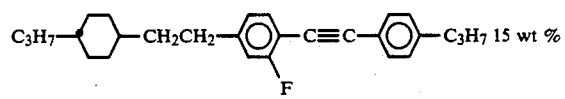 C$_3$H$_7$ 15 wt %

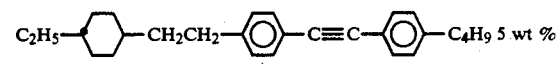 C$_4$H$_9$ 5 wt %

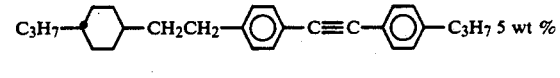 C$_3$H$_7$ 5 wt %

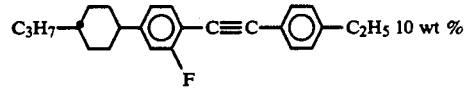 C$_2$H$_5$ 10 wt % and the following five compounds as the third component:

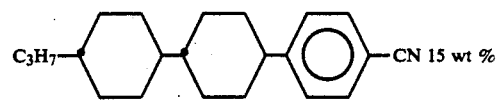 CN 15 wt %

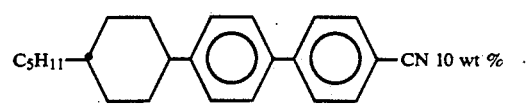 CN 10 wt %

-continued

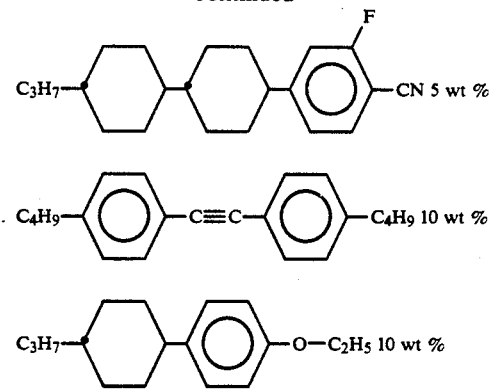

and its characteristics were measured in the same manner as in Example 1. The results are shown in Table 5.

TABLE 5

| | Example | | | | | | | | | | | | | | Comp. ex. |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 |
| Clearing point [°C.] | 86.4 | 94.3 | 90.4 | 126.6 | 84.1 | 116.2 | 96.8 | 105.8 | 83.8 | 85.1 | 99.6 | 115.2 | 102.2 | 124.9 | 81.2 |
| Optical anisotropy | 0.163 | 0.150 | 0.164 | 0.150 | 0.163 | 0.148 | 0.131 | 0.167 | 0.162 | 0.145 | 0.176 | 0.170 | 0.165 | 0.184 | 0.155 |
| Viscosity [cp] | 29.8 | 39.0 | 26.4 | 33.7 | 25.9 | 28.8 | 28.2 | 27.6 | 29.9 | 29.6 | 30.6 | 23.2 | 21.4 | 30.9 | 43.8 |
| $V_{10}(25°\text{ C.})$ [V] | 1.86 | 1.70 | 1.68 | 1.91 | 1.81 | 2.20 | 1.81 | 1.74 | 1.86 | 1.93 | 2.03 | 2.44 | 1.88 | 2.15 | 1.60 |
| $\alpha$ (25° C.) [V] | 1.099 | 1.088 | 1.102 | 1.076 | 1.097 | 1.106 | 1.098 | 1.104 | 1.097 | 1.099 | 1.102 | 1.098 | 1.102 | 1.091 | 1.125 |
| $N_{max}$ (25° C.) | 113 | 141 | 107 | 187 | 117 | 99 | 115 | 103 | 117 | 113 | 107 | 115 | 107 | 132 | 73 |
| $k_{33}/k_{11}$ | 1.46 | 2.10 | 1.93 | 2.02 | 1.54 | 1.46 | 2.02 | 1.48 | 1.62 | 1.64 | 1.50 | 1.68 | 1.67 | 2.00 | 1.10 |

The effectiveness brought about by the present invention consists in the steepness of the voltage-transmittance characteristic curve has been improved retaining various characteristics required for a SBE mode in a well-balanced manner, particularly a high clearing point, a low viscosity and a controllable Δn.

The value of the steepness α defined in the formula (I) is preferred to be closer to 1 in the case of liquid crystal elements having multiplex drive mode, and in the present invention, a lower α value is achieved. This is because the compounds of the formulas (I) and (II), further, mixtures obtained by adding the compounds of the formulas (III) or (IV) as the third component to the above compounds, and still further, mixtures obtained by further adding the compounds of the formula (V) as the fourth component to the above compounds contribute thereto. This is indicated by comparison of the above examples with the above comparative example. By means of the compounds of the formulas (I) and (II), and further the compounds of formula (III) as the third component, and still further the compounds of the formula (V) added to the above compounds in suitable proportions, not only the α value but also the viscosity have been improved.

Since the liquid crystal composition of the present invention has the above-mentioned characteristics, when it is used for a liquid crystal device, a multiplex drive of 1/100 duty or more according to SBE mode is possible. Further, the high clearing point and the low viscosity, of course, also makes possible its use in the 90° twist TN mode wherein the problem of the steepness is not particularly raised.

What is claimed is:

1. A liquid crystal composition for a supertwisted birefringence effect display including, a first component comprising at least one member of compounds expressed by the formula

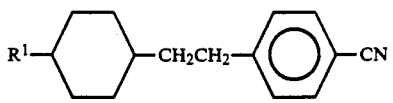           (I)

wherein $R^1$ represents an alkyl group of 1 to 10 carbon atoms, and a second component comprising at least one member of compounds expressed by the formula

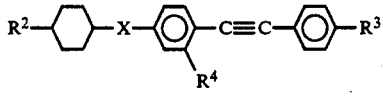           (II)

wherein $R^2$ represents an alkyl group of 1 to 10 carbon atoms, $R^3$ represents an alkyl group or an alkoxy group each of 1 to 10 carbon atoms, $R^4$ represents H or F and X represents a single bond or —CH$_2$CH$_2$— and the blending proportion of the first component is 20 to 70% by weight and that of the second component is 20 to 50% by weight.

2. A liquid crystal composition for a supertwisted birefringence effect display including, the first and second components as set forth in claim 1 and further a third component comprising at least one member selected from the group consisting of compounds expressed by the formula

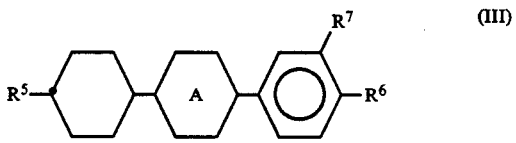           (III)

wherein $R^5$ represents an alkyl group of 1 to 10 carbon atoms, $R^6$ represents F or a CN group, $R^7$ represents H or F,

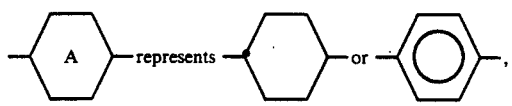

and compounds expressed by the formula

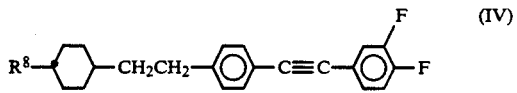 (IV)

wherein R⁸ represents an alkyl group of 1 to 10 carbon atoms and the blending proportions of the first component, the second component and the third component are 10 to 60% by weight, 10 to 40% by weight and 10 to 40% by weight, respectively.

3. A liquid crystal composition according to claim 2, wherein the compounds of the formula (III) are those expressed by the formula

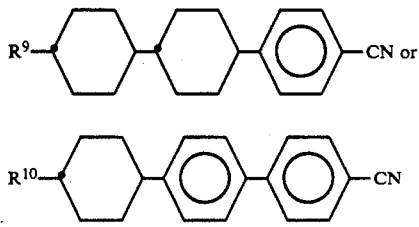

wherein $R^9$ and $R^{10}$ each independently represent an alkyl group of 1 to 10 carbon atoms.

4. A liquid crystal composition according to claim 2, wherein the compounds of the formula (III) are those expressed by the formula

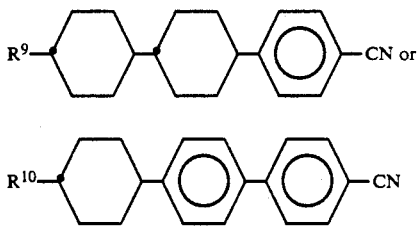

wherein $R^9$ and $R^{10}$ each independently represent an alkyl group of 1 to 10 carbon atoms, and the blending proportions of the first component, the second component and the third component are 10 to 60% by weight, 10 to 40% by weight and 10 to 40% by weight, respectively.

5. A liquid crystal composition for a supertwisted birefringence effect display including, the first, second and third components as set forth in claim 2 and further a fourth component comprising at least one member of compounds expressed by the formula

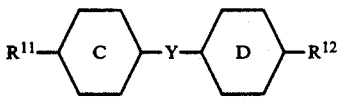 (V)

wherein $R^{11}$ and $R^{12}$ each independently represent an alkyl group, an alkoxy group or an alkoxymethyl group each of 1 to 10 carbon atoms,

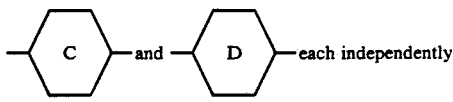

and Y represents a single bond, —COO—, —C≡C— or —CH₂CH₂—.

6. A liquid crystal composition for a supertwisted birefringence effect display including, the first, second and third components as set forth in claim 2 and further a fourth component comprising at least one member of compounds expressed by the formula

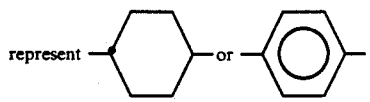 (V)

wherein $R^{11}$ and $R^{12}$ each independently represent an alkyl group, an alkoxy group or an alkoxymethyl group each of 1 to 10 carbon atoms,

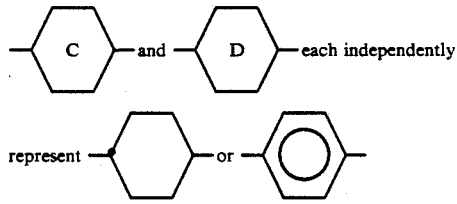

and Y represents a single bond, —COO—, —C≡C— or —CH₂CH₂—. and the blending proportions of the first, second, third and fourth components are 10 to 60% by weight, 10 to 40% by weight, 10 to 40% by weight and 10 to 40% by weight, respectively.

7. A liquid crystal composition for a supertwisted birefringence effect display including the first, second and third components as set forth in claim 2 and further a fourth component comprising compounds expressed by the formula

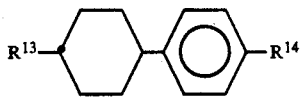

wherein $R^{13}$ represents an alkyl group of 1 to 10 carbon atoms and $R^{14}$ represents an alkoxy group of 1 to 10 carbon atoms.

8. A liquid crystal composition for a supertwisted birefringence effect display comprising as indispensable components, the first, second and third components as set forth in claim 2 and further a fourth component comprising compounds expressed by the formula

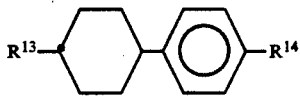

wherein $R^{13}$ represents an alkyl group of 1 to 10 carbon atoms and $R^{14}$ represents an alkoxy group of 1 to 10 carbon atoms, and the blending proportions of the first, second, third and fourth components are 10 to 60% by weight, 10 to 40% by weight, 10 to 40% by weight and 10 to 40% by weight, respectively.

9. A liquid crystal display element using the liquid crystal composition set forth in claim 1.

10. A liquid crystal display element using the liquid crystal composition set forth in claim 2.

11. A liquid crystal display element using the liquid crystal composition set forth in claim 3.

12. A liquid crystal display element using the liquid crystal composition set forth in claim 4.

13. A liquid crystal display element using the liquid crystal composition set forth in claim 5.

14. A liquid crystal display element using the liquid crystal composition set forth in claim 6.

15. A liquid crystal display element using the liquid crystal composition set forth in claim 7.

16. A liquid crystal display element using the liquid crystal composition set forth in claim 8.

* * * * *